(12) United States Patent
Wang et al.

(10) Patent No.: US 8,878,820 B2
(45) Date of Patent: Nov. 4, 2014

(54) OPTICAL TOUCH MODULE

(75) Inventors: Wen-Chun Wang, Taichung (TW);
Jyh-Yeuan Ma, Taoyuan (TW);
Chong-Yang Fang, Taichung (TW);
Tsung-Yen Hsieh, Taichung (TW)

(73) Assignees: Wintek Corporation, Taichung (TW);
Wintek (China) Technology Ltd.,
Dongguan, Guangdong Province (CN)

( * ) Notice: Subject to any disclaimer, the term of this patent is extended or adjusted under 35 U.S.C. 154(b) by 190 days.

(21) Appl. No.: 13/614,134

(22) Filed: Sep. 13, 2012

(65) Prior Publication Data
US 2013/0069913 A1 Mar. 21, 2013

(30) Foreign Application Priority Data

Sep. 15, 2011 (TW) .............................. 100133236 A

(51) Int. Cl.
*G06F 3/042* (2006.01)
*G06F 3/033* (2013.01)
*G09G 5/08* (2006.01)
*G06F 3/041* (2006.01)

(52) U.S. Cl.
CPC .................................... *G06F 3/0421* (2013.01)
USPC ............ 345/175; 345/166; 345/173; 345/176

(58) Field of Classification Search
CPC ..... G06F 3/0421; G06F 3/0412; G06F 3/042;
G06F 3/038; G06F 3/0304; G06F 3/0488;
G06F 3/04883; G06F 2203/04109
USPC .................. 345/166, 173, 175, 176
See application file for complete search history.

(56) References Cited

U.S. PATENT DOCUMENTS

| | | | |
|---|---|---|---|
| 6,836,367 B2 | 12/2004 | Seino et al. | |
| 7,333,094 B2 | 2/2008 | Lieberman et al. | |
| 2001/0026268 A1* | 10/2001 | Ito | 345/175 |
| 2009/0141002 A1* | 6/2009 | Sohn et al. | 345/175 |
| 2010/0045634 A1* | 2/2010 | Su et al. | 345/175 |
| 2010/0141557 A1* | 6/2010 | Gruhlke et al. | 345/32 |
| 2011/0037730 A1* | 2/2011 | Wang et al. | 345/175 |
| 2011/0069037 A1 | 3/2011 | Su | |

FOREIGN PATENT DOCUMENTS

| | | |
|---|---|---|
| TW | 201106229 A1 | 2/2011 |
| TW | 201112092 A1 | 4/2011 |
| TW | M408077 | 7/2011 |

OTHER PUBLICATIONS

TW Office Action dated Apr. 16, 2014.
English Abstract of TWM408077 (Published Jul. 21, 2011).

* cited by examiner

*Primary Examiner* — Aneeta Yodichkas
(74) *Attorney, Agent, or Firm* — McClure, Qualey & Rodack, LLP

(57) ABSTRACT

An optical touch module includes a transparent substrate and two light processing units. The transparent substrate includes a touch surface, a sub-surface parallel to the touch surface, and a surrounding side surface connected to the touch surface and the sub-surface. The two light processing units are positioned on two neighboring corners of the transparent substrate, and each of the two light processing units includes a light source and a detector. The light source and the detector respectively have a light emitting surface and a light entry surface, the light emitting surface of the light source and the light entry surface of the detector both face the surrounding side surface, and the two light processing units are positioned beneath the touch surface.

10 Claims, 5 Drawing Sheets

OPTICAL TOUCH MODULE

This application claims the benefit of Taiwan application Serial No. 100133236, filed Sep. 15, 2011, the subject matter of which is incorporated herein by reference.

BACKGROUND OF THE INVENTION

1. Field of the Invention

The invention relates in general to an optical touch module and a touch display using the same, and more particularly to an optical touch module, which projects and transmits a light to a transparent substrate and realizes optical touch control according to whether the light is totally reflected, and a touch display using the same.

2. Description of the Related Art

With the rapid advance in science and technology, touch display has been widely used in various electronic products. The touch display may be categorized into for example, resistive touch panel, capacitive touch panel and optical touch panel. Let the optical touch panel be taken for example. The optical touch panel normally has a light source and an image sensor. When the user triggers a touch event within the touch area, an object which touches a touch point blocks the light such that the image sensor senses a dark point corresponding to the position of the touch point in a sensed image. Based on the position of the dark point in the sensed image, the angle of the line connecting the touch point and the image sensor with respect to the edge of the touch panel may be obtained through calculation. As the distance between the touch point and the image sensor is known, the coordinates of the touch point with respect to the display panel may be obtained by the triangulation location method.

For the image sensor to be able to sense an image within a touch area, the positions of the light source and the image sensor in a conventional optical touch module are higher than the touch surface of the touch panel, so the touch panel cannot be realized as a full-flat touch panel. Therefore, how to provide a full-flat optical touch module has become an imminent task for the industries.

SUMMARY OF THE INVENTION

The invention is directed to an optical touch module and a touch display using the same. The optical touch module of the invention includes a transparent substrate having a touch surface, a sub-surface, and a surrounding side surface connected to the touch surface and the sub-surface. The optical touch module of the invention further includes two light processing units positioned on two neighboring corners of the transparent substrate. Each light processing unit has a light source and a detector. The light source has a light emitting surface via which the light is projected and transmitted to the transparent substrate through total reflection. The light is interrupted due to a user's touch operation. The detector has a light entry surface. Interrupt of the light total reflection due to the user's control operation is detected and used for detecting the touch operation triggered on the touch surface. By using the two light processing units for detection, the optical touch module of the invention may find the position of the user's touch operation by the triangulation location method. In comparison to the conventional optical touch module, the optical touch module of the invention has the advantages of correspondingly disposing the light source and the detector at a position close to the sloping surface and the chamfer surface and having a full-flat structure.

According to an embodiment of the present invention, an optical touch module including a transparent substrate and two light processing units is disclosed. The transparent substrate includes a touch surface, a sub-surface parallel to the touch surface, and a surrounding side surface connected to the touch surface and the sub-surface. The two light processing units are positioned on two neighboring corners of the transparent substrate. Each light processing unit has a light source and a detector. The light source has a light emitting surface and the detector has a light entry surface. The light emitting surface of the light source and the light entry surface of the detector both face the surrounding side surface, and each light processing unit is positioned beneath the touch surface.

The above and other contents of the invention will become better understood with regard to the following detailed description of the preferred but non-limiting embodiment(s). The following description is made with reference to the accompanying drawings.

DETAILED DESCRIPTION OF THE INVENTION

Figure 1:
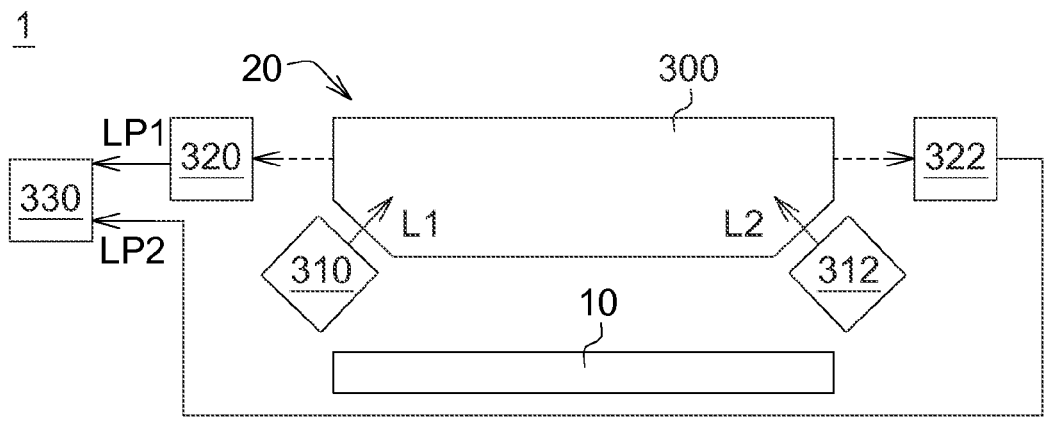
FIG. 1 shows a block diagram of a touch display according to an embodiment of the invention.

Referring to FIG. 1, a block diagram of a touch display according to an embodiment of the invention is shown. For example, the touch display 1 includes a display panel 10 and an optical touch module 20. The optical touch module 20 is disposed on the display panel 10, and includes a transparent substrate 300 and two light processing units. The transparent substrate 300 is made from such as polymethylmethacrylate (PMMA).

Figure 2A:
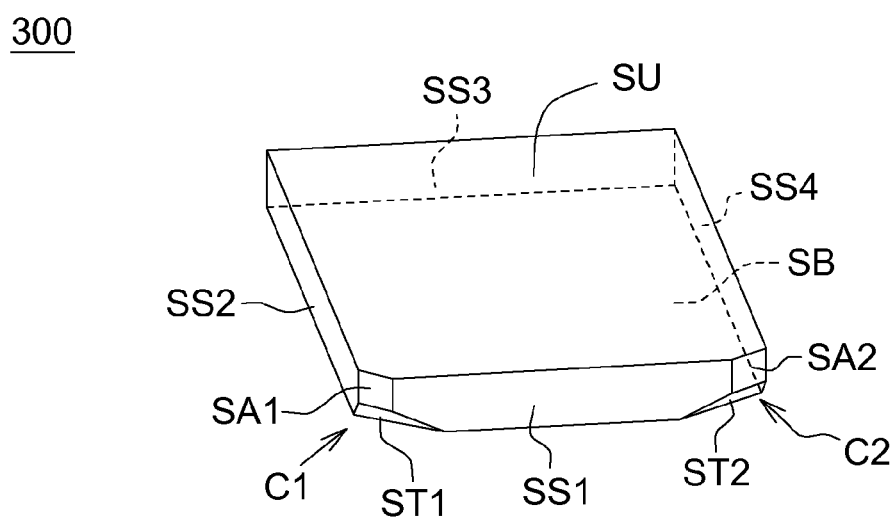
FIG. 2A-2D respectively show a 3D diagram of a transparent substrate 300 of FIG. 1, a top view of the transparent substrate 300, a cross-sectional view along cross-sectional line A-A' of FIG. 2B, and a cross-sectional view along a cross-sectional line B-B' of FIG. 2B.
Figure 2B:
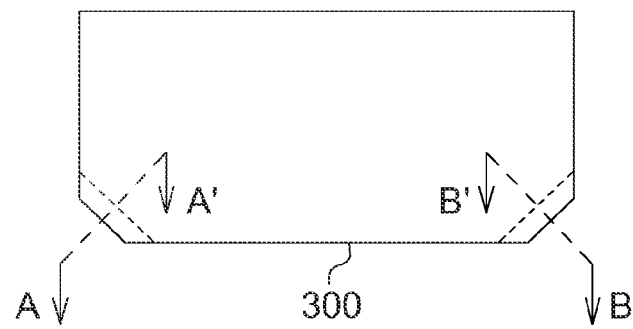

Referring to FIGS. 2A-2D, a 3D diagram of a transparent substrate 300 of FIG. 1, a top view of the transparent substrate 300, a cross-sectional view along cross-sectional line A-A' of FIG. 2B, and a cross-sectional view along a cross-sectional line B-B' of FIG. 2B are respectively shown. The transparent substrate 300 includes a touch surface SU, a sub-surface SB and a surrounding side surface. The touch surface SU is parallel to the sub-surface SB and connected to the surrounding side surface.

The two light processing units are respectively disposed at two neighboring corners, such as corner angles C1 and C2, of the transparent substrate 300. Each light processing unit has a light source and a detector. For example, the first light processing unit includes a light source 310 and a detector 320, and the second light processing unit includes a light source 312 and a detector 322.

In the first light processing unit, the light source 310 has a light emitting surface L1, and the detector 320 has a light entry surface. The light emitting surface of the light source 310 and the light entry surface of the detector 320 both face the surrounding side surface. The first and the second light processing units are positioned beneath the touch surface SU. The structures of the light source 312 and the detector 322 of the second light processing units are similar to that of the light source 310 and the detector 320 of the first light processing units, and the similarities are not repeated here.

For example, the surrounding side surface includes side surfaces SS1~SS4, and corner angles C1 and C2. The side surface SS1 is perpendicular to the side surfaces SS2 and SS4 and parallel to the side surface SS3. The side surfaces SS2 and SS4 are parallel to each other. The side surfaces SS2, SS3 and SS4 has a reflection structure. For example, the reflection structure on the side surfaces SS2~SS4 may be realized by a micro-prism structure or a roughened surface structure for partly reflecting the light projected onto the side surfaces.

Figure 2C:
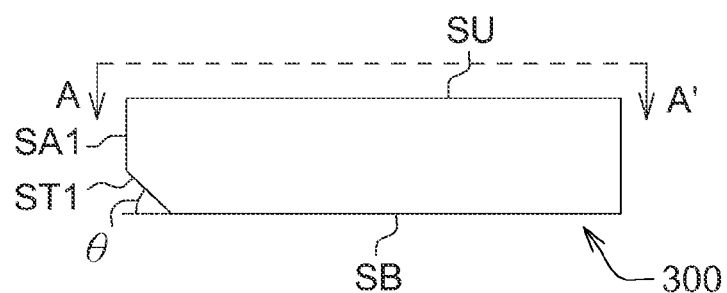

As indicated in FIG. 2B, the corner angle C1 is adjacent to the side surfaces SS1 and SS2 and connected between the touch surface SU and the sub-surface SB. The corner angle C1 further includes a chamfer surface SA1 and a sloping surface ST1. One side of the chamfer surface SA1 is connected to the touch surface SU, and the chamfer surface SA1 is perpendicular to the touch surface SU. The other side of the chamfer surface SA1 is connected to one side of the sloping surface ST1. Also, as indicated in FIG. 2C, the other side of the sloping surface ST1 is connected to the sub-surface SB, and an inclination angle $\theta$ is complementary to an angle formed between the sloping surface ST1 and the sub-surface SB. In other words, the inclination angle $\theta$ is formed between the sloping surface ST1 and an extension surface of the sub-surface SB. The inclination angle $\theta$ corresponds to a total reflection critical angle of the transparent substrate 300. For example, the inclination angle $\theta$ is a total reflection critical angle between the material of the transparent substrate 300 and the air medium. In an operating embodiment, the indexes of refraction for the material of the transparent substrate 300 and the air medium are 1.49 and 1, respectively, and the corresponding total reflection critical angle is 42.15 degrees.

Figure 2D:
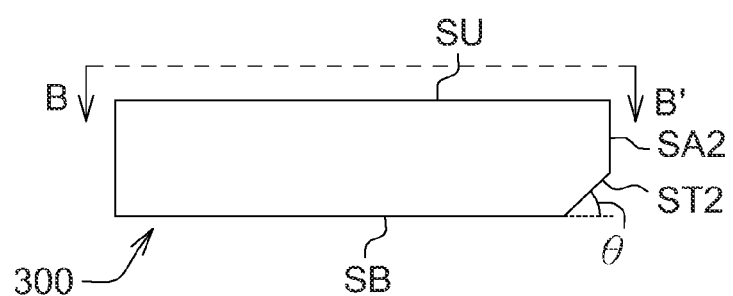

As indicated in FIG. 2D, the corner angle C2 is adjacent to the side surfaces SS1 and SS4, and further includes a chamfer surface SA2 and a sloping surface ST2. The structures of the chamfer surface SA2 and the sloping surface ST2 are similar to that of the chamfer surface SA1 and the sloping surface ST1, and the similarities are not repeated here.

Figure 3A:
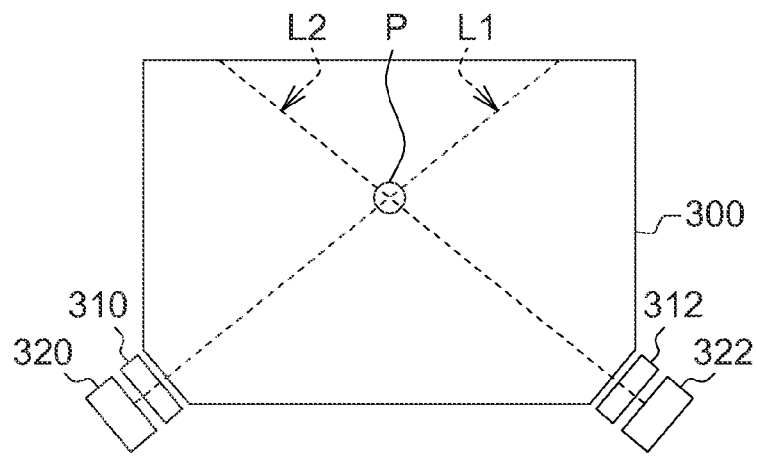
FIGS. 3A and 3B respectively show a top view and a side view of an optical touch module 20.
Figure 3B:
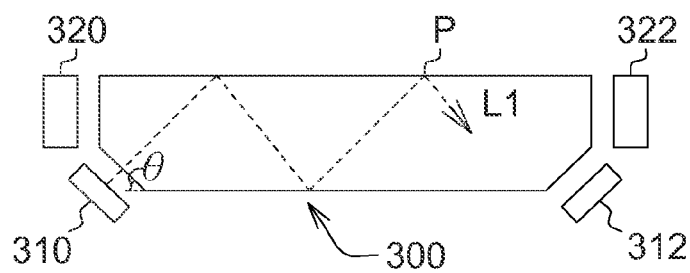

The light source 310 is adjacent to the sloping surface ST1 used as a light entry surface via which a light L1 is projected to the transparent substrate 300. The light source 310, such as a point light source incorporated with a refractive optical element or a diffractive optical element (such as a micro-lens structure), provides a light spread over the entire side surfaces SS2-SS4 of the transparent substrate 300. Or, the light source 310 whose angle of divergence is such as 90 degrees also provides a light spread over the entire side surfaces SS2~SS4 of the transparent substrate 300. By using the structure on the corner angle C1, the light source 310 may be restricted to be beneath the transparent substrate 300 rather than being protruded from the touch surface SU. For example, the light L1 emitted by the light source 310 is further projected to the transparent substrate 300 at an angle perpendicular to the sloping surface ST1. After entering the transparent substrate 300, the light L1 is projected to the touch surface SU at an inclination angle $\theta$, such that the light L1 may be transmitted in the transparent substrate 300 through total reflection. For example, the light L1 emitted by the light source 310 may be transmitted in the transparent substrate 300 as indicated in FIGS. 3A and 3B.

The light source 312 is adjacent to the sloping surface ST2 used as a light entry surface via which a light L2 is projected to the transparent substrate 300. The light source 312, such as a point light source, provides a light spread over the entire side surfaces SS2~SS4 of the transparent substrate 300. By using the structure on the corner angle C2, the light source 312 may be restricted to be beneath the transparent substrate 300 rather than being protruded from the touch surface SU. For example, the light L2 emitted by the light source 312 is further projected to the transparent substrate 300 at an angle perpendicular to the sloping surface ST2. Like the light L1, the light L2, after entering the transparent substrate 300, is transmitted in the transparent substrate 300 through total reflection.

Figure 4:
FIG. 4 shows a dark pattern on the side surfaces SS3 and SS4 by the projection of a light corresponding to a touch position P.

Referring to FIGS. 2A, 3A, 3B and 4, when the finger touches the touch position P on the touch surface SU, the finger interrupts the total reflection of the lights L1 and L2 at the touch position P, and thus the light L1 is projected on the side surface SS3 and SS4 via the touch position P. By so, a brightness distribution as indicated in FIG. 4 is obtained. The area of oblique lines in FIG. 4 denotes the dark pattern corresponding to the touch position P. Likewise, the light L2 is projected on the side surfaces SS2 and SS3 via the touch position P to generate a similar brightness distribution.

As indicated in FIG. 1, the detector 320, adjacent to the chamfer surface SA1 used as a light emitting surface, detects the above brightness distribution and generates a brightness detection signal LP1. For example, the detector 320 is a photo-sensing element such as a charge-coupled device (CCD) photo-sensing element. The detector 320 captures the brightness distribution generated by the light L1 in the transparent substrate 300 via the chamfer surface SA1, and generates a brightness detection signal LP1 accordingly. For example, the brightness detection signal LP1 is an image viewed in a direction towards the side surface SS3 and SS4 from the position of the detector 320.

Likewise, the detector 322, adjacent to the chamfer surface SA2 used as a light emitting surface, detects the above brightness distribution and generates a brightness detection signal LP2. For example, the detector 322 captures the brightness distribution generated by the light L2 in the transparent substrate 300 via the chamfer surface SA2, and generates a brightness detection signal LP2 accordingly. For example, the brightness detection signal LP2 is an image viewed in a direction towards the side surfaces SS2 and SS3 from the position of the detector 322.

The processor 330, coupled to the detector 320 and 322, determines the relative position information of the touch position P in response to the brightness detection signals LP1 and LP2 recorded in the detectors 320 and 322.

For the optical touch module 20 of the present embodiment, the thickness of the transparent substrate 300 is related to the times of total reflection of the lights L1 and L2. The thicker the transparent substrate 300 is, the fewer the times of total reflection of the lights L1 and L2 will be, such that the optical touch module 20 correspondingly has lower resolution in touch detection. Thus, the thickness of the transparent substrate 300 may be reduced, and the optical touch module 20 of the present embodiment will correspondingly have higher resolution for touch detection.

In the present embodiment, the material of the transparent substrate 300 is exemplified by PMMA, but the optical touch module of the present embodiment is not limited thereto, and the material of the transparent substrate 300 may be realized by other transparent material. For example, the transparent substrate of the present embodiment 300 may further be realized by polycarbonate (PC).

Figure 5:
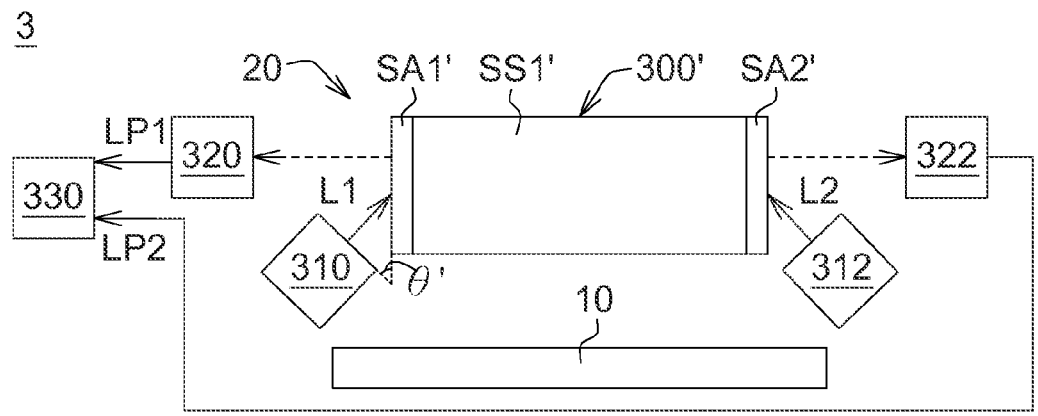
FIG. 5 shows another block diagram of a touch display according to an embodiment of the invention.
Figure 6:
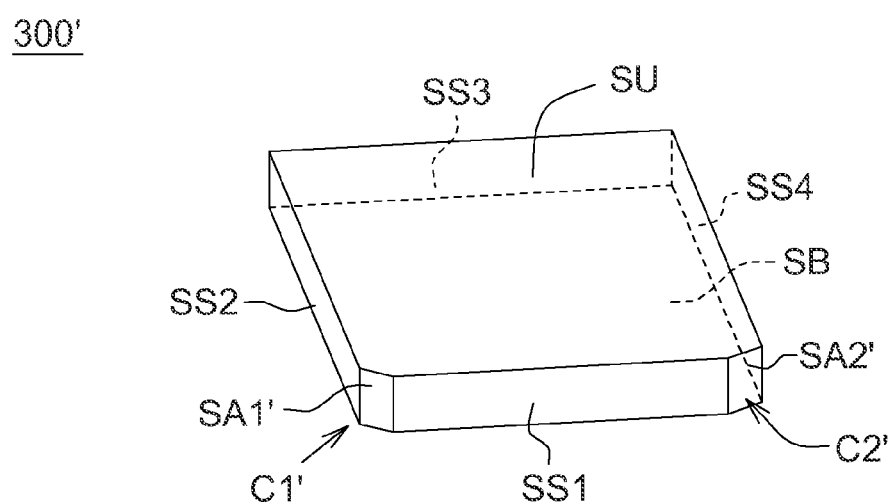
FIG. 6 shows a 3D diagram of a transparent substrate 300 of FIG. 5.

In the present embodiment, the structure of the transparent substrate 300 is exemplified by that indicated in FIG. 2A but the transparent substrate of the present embodiment is not limited thereto. In other examples, the structure of the transparent substrate 300' may also be realized as indicated in FIG. 5 and FIG. 6. Furthermore, the surrounding side surface corresponds to the corner angles C1' and C2' at two corners respectively, and the corner angles C1' and C2' are connected between the touch surface SU and the sub-surface SB.

Furthermore, the corner angles C1' and C2' respectively include chamfer surface SA1' and SA2' whose one side is connected to the touch surface SU, and the other side opposite to the touch surface SU is connected to the sub-surface SB. The chamfer surface SA1' and SA2' is perpendicular to the touch surface SU. One of the two light processing units (such as the light processing unit including a light source 310 and a detector 320) corresponds to the chamfer surface SA1'. The light emitting surface of the light source 310 and the light entry surface of the detector 320 both face the chamfer surface SA1'. The other one of the two light processing units (such as the light processing unit including a light source 312 and a detector 322) corresponds to the chamfer surface SA2'. The light emitting surface of the light source 312 and the light entry surface of the detector 322 both face the chamfer surface SA2'. Preferably, an angle θ' is formed between the light emitting surface of each of the light sources 310 and 312 and corresponding chamfer surfaces SA1' and SA2'. The angle θ' is a total reflection critical angle between the material of the transparent substrate 300' and the air medium, such that the light L1 may be transmitted in the transparent substrate 300 through total reflection.

The optical touch module of the present embodiment includes a transparent substrate. The transparent substrate has a touch surface, a sub-surface and a surrounding side surface connected to the touch surface and the sub-surface. The optical touch module of the present embodiment further includes two light processing units positioned on two neighboring corners of the transparent substrate. Each light processing unit has a light source and a detector. The light source has a light emitting surface via which a light is projected to the transparent substrate, such that the light is transmitted in the transparent substrate through total reflection. The light is interrupted due to the user's touch operation. The detector has a light entry surface. By using the two light processing units for detection, the optical touch module of the invention may find the position of the user's touch operation by the triangulation location method. In comparison to the conventional optical touch module, the optical touch module of the invention has the advantages of correspondingly disposing the light source and the detector at a position close to the sloping surface and the chamfer surface, positioning each light processing unit beneath the touch surface, and having a full-flat structure.

Figure 7:
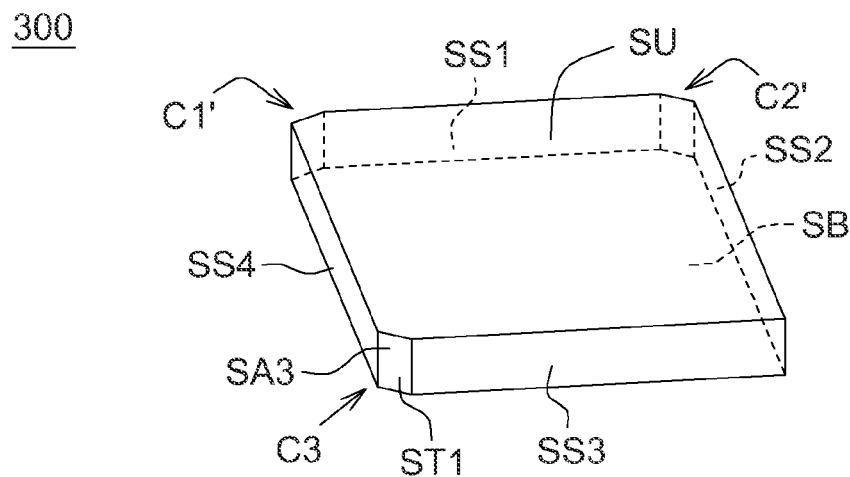
FIG. 7 shows the touch display of the invention equipped with an auxiliary detector.

Referring to FIG. 7, the touch display of another embodiment of the invention equipped with an auxiliary detector is shown. The auxiliary detector includes at least one detection unit 340, such as a photo-sensing charge-coupled device (CCD). The detection unit 340 is selectively disposed at one of two other corners of the transparent substrate 300 (such as at the position of the corner angle C3), and is also positioned beneath the touch surface. The corner angle C3 includes a chamfer surface SA3 whose one side is connected to the touch surface SU and the other side opposite to the touch surface SU is connected to the sub-surface SB. The chamfer surface SA3 is perpendicular to the touch surface SU. The light entry surface of the detection unit 340 faces the chamfer surface SA3.

Figure 8:
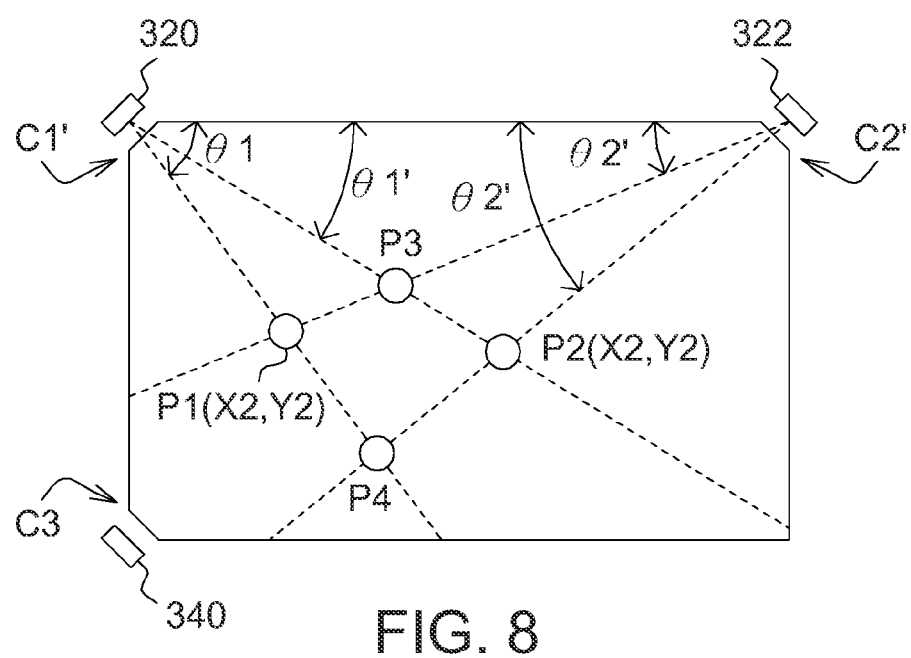
FIG. 8 shows pseudo touch points which occur during touch operation.

Referring to FIG. 8, pseudo touch points which occur during touch operation are shown. Meanwhile, if the points P1 and P2 are touched, the detector 320 of two light processing units will erroneously judge that the points P3 and P4 (pseudo touch points) are also touched. The detection unit 340 detects the occurrence of pseudo touch points when touch operation is performed, hence increasing the accuracy of touch operation.

The number of detection unit 340 indicated in FIGS. 7 and 8 is exemplified by 1, but the invention is not limited thereto. To increase the accuracy in judging the touch points, the invention may have extra detection units disposed at another corner or at any position on the side surface SS3.

In addition, the optical touch module of the present embodiment may use a flat transparent substrate as a medium for the transmission of the light. Thus, the optical touch module of the present embodiment further has the advantage of being used in a thinned and large-sized touch display without affecting the display effect.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical touch module used in a flat display, comprising:
    a transparent substrate, comprising:
    a touch surface and a sub-surface parallel to the touch surface; and
    a surrounding side surface connected to the touch surface and the sub-surface; and
    two light processing units positioned on two neighboring corners of the transparent substrate, wherein each light processing unit has a light source and a detector respectively having a light emitting surface and a light entry surface, the light emitting surface of the light source and the light entry surface of the detector both face the surrounding side surface, and each light processing unit is positioned beneath the touch surface,
    wherein, each of the two corners comprises:
    a chamfer surface whose one side is connected to the touch surface, wherein the chamfer surface is perpendicular to the touch surface; and
    a sloping surface whose one side is connected to the other side of the chamfer surface and the other side is connected to the sub-surface, wherein an inclination angle is formed between the sloping surface and the sub-surface and corresponds to the total reflection critical angle of the transparent substrate.

2. The optical touch module according to claim 1, wherein:
    the surrounding side surface respectively corresponds to two corner angles at each of the two corners;
    each of the two corner angles is connected between the touch surface and the sub-surface; and
    wherein the light entry surfaces of the two detectors respectively face the chamfer surfaces of the two corner angles;

and the light emitting surfaces of the two light sources respectively face the sloping surfaces of the two corner angles.

3. The optical touch module according to claim 1, wherein the surrounding side surface comprises:
   a first side surface and a second side surface perpendicular to each and adjacent to a first corner of the two corners, wherein the second side surface comprises a first reflection structure;
   a third side surface opposite and parallel to the first side surface and adjacent to the second side surface, wherein the third side surface comprises a second reflection structure; and
   a fourth side surface opposite and parallel to the second side surface and adjacent to the third and the first side surfaces, wherein the fourth side surface comprises a third reflection structure;
   wherein, the first and the fourth side surfaces are adjacent to a second corner of the two corners.

4. The optical touch module according to claim 3, wherein each of the first, the second and the third reflection structures has a micro-prism structure for partly reflecting light transmitted to the second, the third and the fourth side surfaces.

5. The optical touch module according to claim 3, wherein each of the first, the second and the third reflection structures has a roughened surface structure partly reflecting light transmitted to the second, the third and the fourth side surfaces.

6. The optical touch module according to claim 1, wherein the light sources of the two light processing units respectively project a first light and a second light to the transparent substrate via the corresponding light emitting surfaces, such that the first and the second lights are transmitted in the transparent substrate through total reflection; and
   when a touch event is triggered at a touch position on the touch surface, the total reflection of the first and the second lights at the touch position are correspondingly interrupted, such that the first and the second lights correspondingly form a brightness distribution on the surrounding side surface.

7. The optical touch module according to claim 6, wherein the detectors of the two light processing units respectively detect the brightness distribution via the corresponding light entry surfaces, and correspondingly output a first brightness detection signal and a second brightness detection signal respectively.

8. The optical touch module according to claim 7, further comprising:
   a processor coupled to the two light processing units, wherein the processor determines relative position information of the touch position in response to the first and the second brightness detection signals.

9. The optical touch module according to claim 1, further comprising at least one detection unit disposed at least one of two other corners of the transparent substrate.

10. The optical touch module according to claim 9, wherein at least one of the two other corners comprises a corner angle, the detection unit is positioned at the corner angle and beneath the touch surface, the corner angle comprises a chamfer surface whose one side is connected to the touch surface, and the other side opposite to the touch surface is connected to the sub-surface, the chamfer surface is perpendicular to the touch surface, and the light entry surface of each detection unit faces respective chamfer surface.

* * * * *